Nov. 14, 1967   H. B. RIGGS   3,352,379
COMBINATION TREE STAND AND GAME CART
Filed Feb. 17, 1967   2 Sheets-Sheet 1
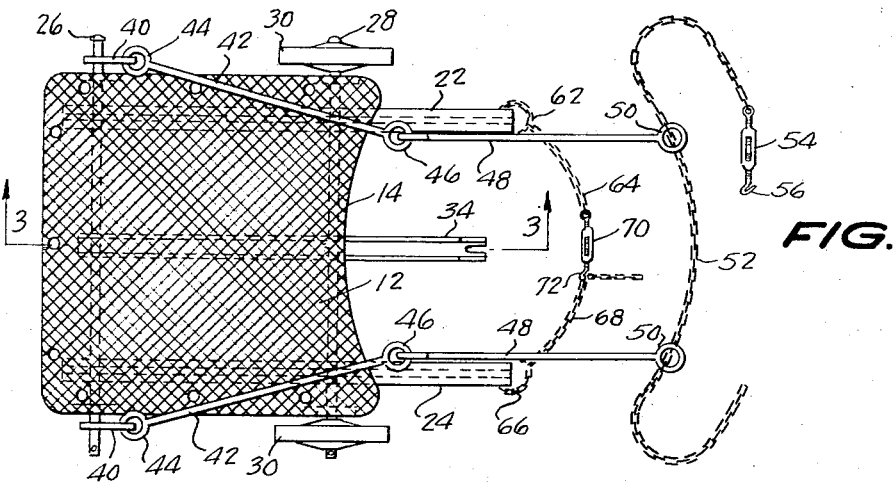
FIG. 1.
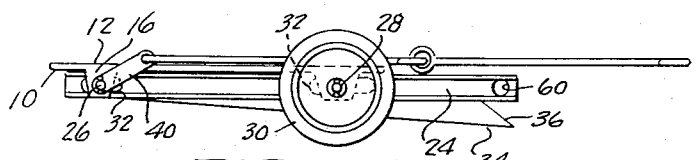
FIG. 2.
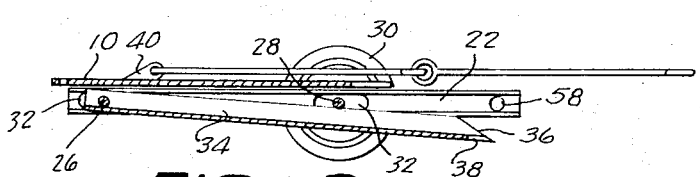
FIG. 3.
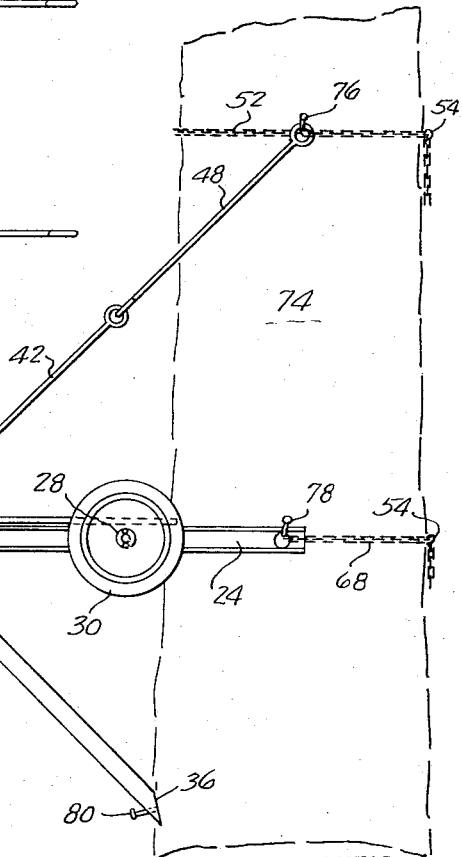
FIG. 4.
FIG. 5.
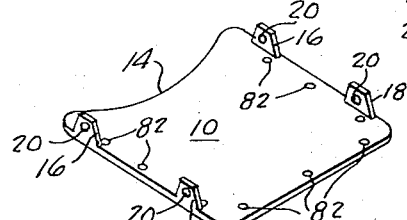
INVENTOR.
HARLEY B. RIGGS,
BY
Berman, Davidson & Berman
ATTORNEYS.

Nov. 14, 1967          H. B. RIGGS          3,352,379
COMBINATION TREE STAND AND GAME CART
Filed Feb. 17, 1967          2 Sheets-Sheet 2
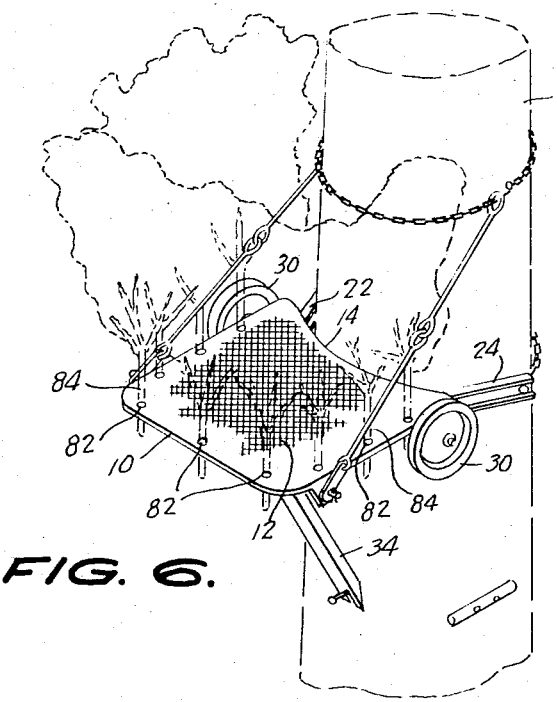
FIG. 6.
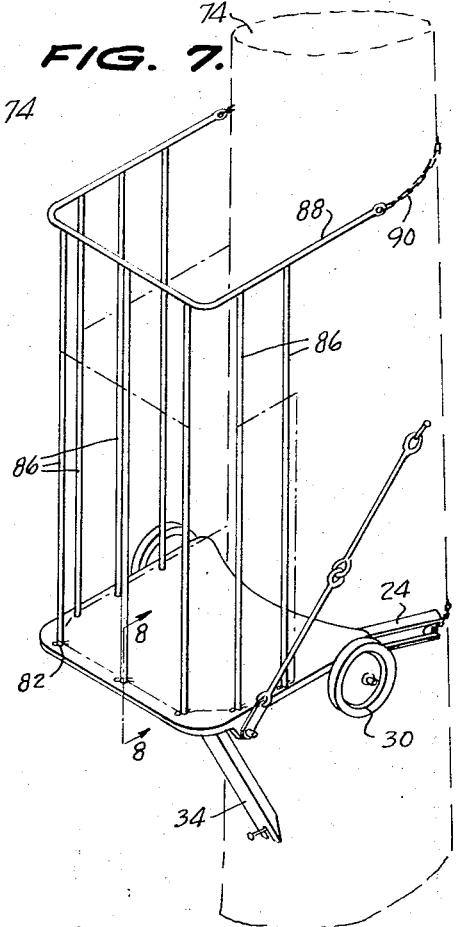
FIG. 7.
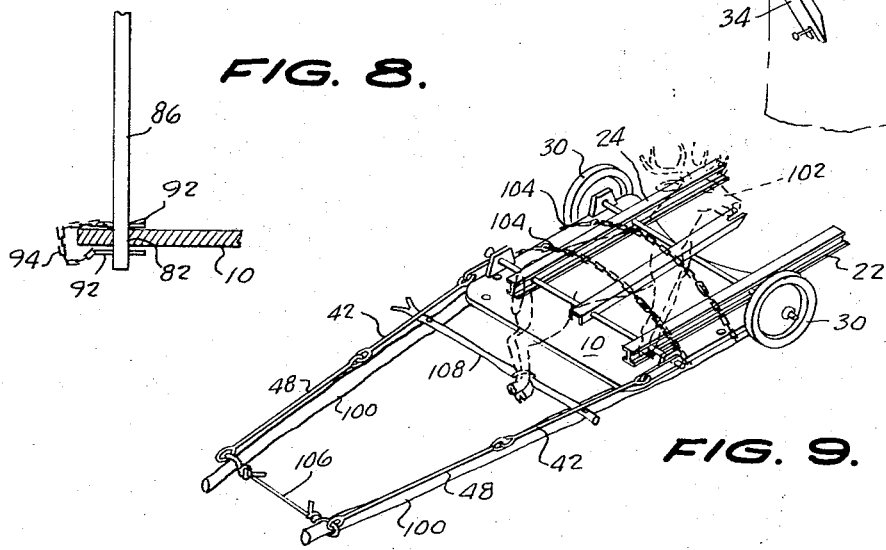
FIG. 8.
FIG. 9.
INVENTOR.
HARLEY B. RIGGS,
BY
Berman, Davidson & Berman
ATTORNEYS.

United States Patent Office 3,352,379
Patented Nov. 14, 1967

3,352,379
COMBINATION TREE STAND AND GAME CART
Harley B. Riggs, 4202 S. Brook St.,
Louisville, Ky. 40214
Filed Feb. 17, 1967, Ser. No. 616,844
6 Claims. (Cl. 182—20)

ABSTRACT OF THE DISCLOSURE

A wheeled platform and means to attach the same to a tree trunk above ground level with the platform projecting laterally from the trunk and braced in position, said platform being usable as a game cart when detached from the tree.

---

This invention relates to tree stands which can be erected in the woods by a huntsman to provide him with an elevated platform supported by a tree trunk. It also relates to such a device which is portable and may be used as a cart which can bring home heavy game such as deer.

It is an object of this invention to provide a device as aforesaid which will be light in overall weight which may be easily and safely attached to a tree trunk above ground level and equally easily detached therefrom.

It is a further object of this invention to provide a device as aforesaid having a platform to project laterally from the tree trunk above ground level and which has a safe "nonskid" surface.

It is a further object of this invention to provide a device as aforesaid having means for mounting cut branches to serve as camouflage for the huntsman and/or to receive a frame for supporting a windbreak, camouflage or other similar accessories.

It is a further object of this invention to provide a device as aforesaid having wheeled mounting whereby it may be easily towed through the woods to the point at which it is desired to be erected and which will serve as a cart for carrying home heavy game such as deer.

The above and other objects will be made clear by the following detailed description taken in connection with the annexed drawings in which:

FIGURE 1 is a plan view of the improved device;
FIGURE 2 is a side elevation of FIGURE 1;
FIGURE 3 is a section on the line 3—3 of FIGURE 1;
FIGURE 4 is a side elevation showing the device as attached to a tree trunk;
FIGURE 5 is a perspective view of the underside of the platform;
FIGURE 6 is a perspective view of the device attached to a tree trunk showing branches in place when camouflage is desired;
FIGURE 7 is a view similar to FIGURE 6, showing the use of a supplementary framework about which camouflage canvas or other windbreakers may be secured;
FIGURE 8 is a section on the line 8—8 of FIGURE 7; and
FIGURE 9 is a perspective view showing the device in the condition in which it may be used for dragging game back through the woods.

Referring now to FIGURE 1, the device comprises a platform 10 preferably of metal and having its upper surface knurled or otherwise roughened as at 12 to provide secure footing despite the weather. One side of the platform 10 is curved inwardly as at 14 to facilitate at least partial conformation with the tree trunk to which the device may be attached.

FIGURE 5 shows the platform 10 and its relieved side 14 from the underside of FIGURE 1. It will be noted that the platform 10 is provided with pairs of lugs 16 and 18, each pair having aligned perforations 20. By means of the lugs 16 and 18 the platform 10 is mounted on side members 22 and 24 by means of a rod 26 passing through the lugs 16 and an axle 28 passing through the lugs 18. A pair of wheels 30 are rotatably mounted on the axle 28 to assure easy portability of the device as a whole.

The rod 26 and the axle 28 pass through elongated slots 32 in side members 22 and 24 which permits limited sliding motion between the platform 10 and the side members 22 and 24 for a purpose presently to be described. A brace or strut member 34 is pivoted approximately centrally of the rod 26 and passes below the axle 28. The strut 24 terminates at its free end in a beveled portion 36 and has a slot 38 adjacent the beveled portion 36.

A pair of links 40 are pivoted to the rod 26 outside the platform 10 and at their free ends each is secured to a rod 42, which rod 42 has at one end an eye 44 engaging a perforation in the free end of the links 40 and a similar eye 46 at the opposite end engaging a similar eye on rods 48. The rods 48 are in all respects similar to the rods 42 and have at their free ends eyes 50 through which pass a chain 52. The chain 52 has at one end a turnbuckle 54 which terminates in a hook 56 for adjustable engagement with the opposite end of the chain 52.

The side member 22 has at one end a perforation 58 (FIGURE 3) while the side member 24 has a similar perforation 60 (FIGURE 2) aligned with the perforation 58. A loop or ring 62 in a chain link 64 engages the perforation 58 in the side member 22 while a similar ring or loop 66 of a chain link 68 engages the perforation 60 of the side member 24. The chain link 64 terminates in a turnbuckle 70 having a hook 72 for adjustable engagement with the chain link 68.

In FIGURE 4 the device is shown as applied to a tree 74. The platform 10 projects laterally from the tree and has its curved edge 14 in engagement with the trunk, with the side members 22 and 24 extending beyond to roughly midway of the diameter of the trunk. The chain links 64 and 68 encircle the trunk, are joined by the hook 72, and adjusted for tension by the turnbuckle 70. The links 40 and the rods 42 and 48 extend diagonally upwardly to where the chain 52 surrounds the trunk with its ends joined by means of the hook 56 and with final adjustment by means of the turnbuckle 54. A strut member 34 extends diagonally downward until its beveled portion 36 engages the tree 74. As shown in FIGURE 4, the attachment to the trunk may be made additionally secure by driving nails 76 through the eyes 50 of the rods 48, while nails 78 may be driven through the perforations 58 and 60 of the side members 24 and 22 and a nail 80 may be driven through the slot 38 and the strut 34 in order to prevent downward slippage.

It will be noted in FIGURE 5 that the platform 10, except for the curved edge 14, has perforations 82 spaced around its remaining margins. These perforations 82 are utilized, as shown in either FIGURE 6 or FIGURE 7. In FIGURE 6 a number of branches 84 have been cut and their stems inserted through the perforations 82, thus providing excellent camouflage for the hunter standing on the platform 10. In FIGURE 7 the perforations 82 receive vertical rod members 86 which at their upper ends are connected by a top frame member 88. The free ends of the frame member 88 are secured to a chain link 90 which passes around the trunk 74. As shown in FIGURE 8, the lower ends of the rods 86 have perforations above and below the platform 10 through which pass cotter pins 92, the cotter pins being secured together by a chain link 94. Canvas may be leashed around the rods 86 to form a windbreak and the rods 86 with their upper frame 88 will constitute a safety railing. The frame member 88, if desired, may be made in three pieces and hinged at the corners for collapsibility.

FIGURE 9 shows the use of the device as a game carrier. In this view, the device has been turned over from the view of FIGURE 1, so that the bottom of the platform 10 is presented, as shown in FIGURE 5. A pair of saplings 100 have been cut and trimmed and pass under the platform 10. A deer carcass 102 has been placed on the underside of the platform 10 and both the deer and the saplings are secured by wrapping around the entire structure chain links 104 which may be improvised from any of the chain links used in ordinary operations. The links 42 and 48 extend along the saplings 100 and provide means for lashing the free ends of the saplings together, by a lashing 106 which also provides a handle for dragging the cart. Depending on the size of the animal being transported, an additional sapling 108 may be secured between the saplings 100.

While certain specific structures have been illustrated and described herein, numerous modifications will occur to those skilled in the art. This invention is not therefore to be limited to the precise details shown but only as set forth in the subjoined claims.

What is claimed is:

1. A combination tree stand and game cart comprising: a platform; a pair of side members secured to said platform by a rod and an axle; a strut pivoted on said platform and underlying said axle; a pair of wheels on said axle outside said platform; tension means for securing said rod to a tree trunk; means for securing the free ends of said side members to said tree trunk, and means on the free end of said strut for engaging said tree trunk.

2. A combination as set forth in claim 1, in which said wheels extend both above and below said platform.

3. A combination as set forth in claim 1, in which said tension means include both links and chains.

4. A combination as set forth in claim 1, including a chain connecting the free ends of said side members and surrounding said tree trunk.

5. A combination as set forth in claim 4, in which said wheels extend both above and below said platform.

6. A combination as set forth in claim 5, in which said tension means include both links and chains.

References Cited

UNITED STATES PATENTS

| | | | |
|---|---|---|---|
| 2,074,586 | 3/1937 | Heinrich et al. | 182—187 |
| 2,711,783 | 6/1955 | Prill | 182—187 |
| 3,116,808 | 1/1964 | Riley | 182—187 |
| 3,282,375 | 11/1966 | Ray | 182—20 |

REINALDO P. MACHADO, *Primary Examiner.*